(No Model.)
E. WESTON.
AUTOMATIC CUT-OFF FOR DYNAMO ELECTRIC MACHINES.
No. 264,979. Patented Sept. 26, 1882.
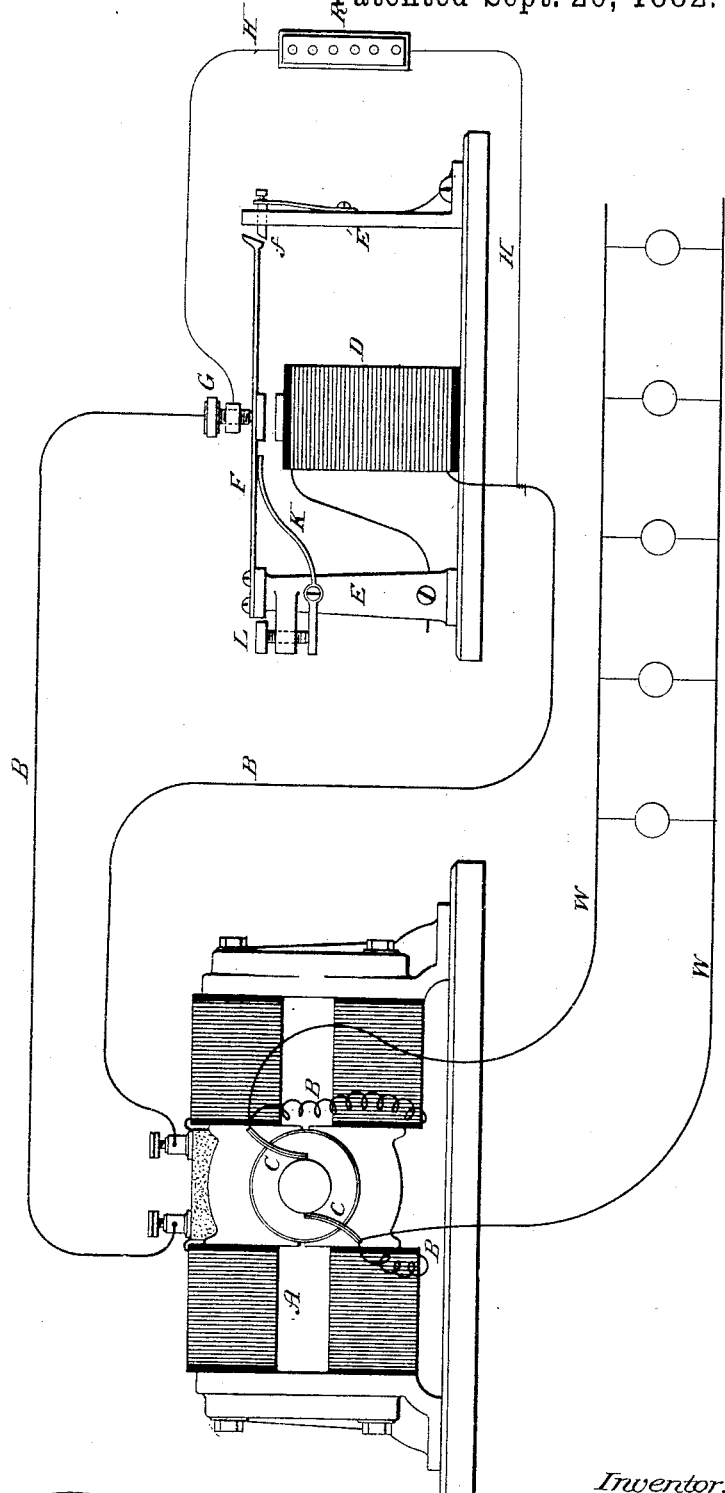
Attest:
Raymond F. Barnes.
W. H. Doggett.
Inventor:
Edward Weston
By Parker W. Page
Atty

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

AUTOMATIC CUT-OFF FOR DYNAMO-ELECTRIC MACHINES.

SPECIFICATION forming part of Letters Patent No. 264,979, dated September 26, 1882.

Application filed May 8, 1882. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Automatic Cut-Offs for Dynamo-Electric Machines, of which the following is a specification.

The subject of my present invention is a device for use with a dynamo-electric machine, the purpose of which mainly is to prevent injury to the machine or devices in circuit therewith in the event of any attempt by unskilled persons to obtain from the machine a greater amount of work than it is capable of safely performing, or when the machine is by accident driven at a higher rate of speed than circumstances warrant.

The invention is applicable to dynamo-electric machines in which the coils of the field-magnets are in a derived circuit from the main; and it consists in the combination, with a machine of the kind described, of an automatic electro-magnetic circuit-breaker or cut-off included in and operated by the said derived circuit, the nature and operation of which will be more fully explained by reference to the accompanying drawing.

The appended diagram illustrates a machine the field-magnets of which are excited by a circuit derived from the main, in combination with the cut-off above mentioned.

The letter A designates such a machine. From the commutator-brushes C C are led the main-circuit wires W W, which convey the current to a number of incandescent or arc lamps or other electrical devices. From the brushes or these wires a derived circuit, B B, is formed, the conductors of which are carried around the field-magnets of the machine, and are brought out preferably at a point between the two sides of the field, for the purpose of operating the cut-off. This is designed to be inclosed in a lock-box placed in the immediate vicinity of the machine, and in so far as the mechanical details of construction are concerned may be greatly varied.

A convenient device consists mainly of a pair of light standards, E E', fixed to a suitable base, a spring or pivoted lever, F, carrying an armature, and an electro-magnet, D, which is included in the field-circuit in the following manner:

Above a spring or lever, F, is a contact-stop, G, to which one end of the wire B, which is broken for this purpose, is connected. The spring F normally rests upon this contact-stop, and forms a path for the current to the standard E, to which the other end of the wire B, after leaving the magnet D, is made fast.

An adjustable spring, K, and thumb-screw L are used to regulate the retractile force of the lever or spring F, and on standard E' is arranged a spring-catch, *f*, which engages the lever F when it is drawn down by the magnet.

In order to prevent the formation of a spark on the rupture of the circuit, a circuit, H, of very high resistance, containing a rheostat, R, if so desired, is formed around the points of contact.

The operation of the apparatus is as follows: Under normal conditions the continuity of the circuit B B is not broken by the magnet D, the spring F being properly adjusted for this purpose. Should the amount of current in this circuit be increased beyond the prescribed limit the magnet acquires sufficient power to overcome the adjusted tension of the spring and draws down the armature, thus breaking the circuit of the field, and thereby rendering the machine inactive. This increase of current strength may be due to several causes, all of which are likely to injure the machine, as well as the devices run thereby. For instance, in a system comprising a generator and a number of incandescent lamps run in multiple arc the candle-power of the lamps, other things being equal, depends upon the rate of speed at which the armature of the generator is driven. If the limit of candle-power at which it is safe to run the lamps be determined and the cut-off adjusted accordingly, any increase in the speed of rotation attempted by unskilled persons with a view to obtaining a higher candle-power will be followed by a rupture of the field-circuit and consequent stoppage of current, since the increased electro-motive force, due to an increased speed, makes itself felt in the derived as well as in the main circuit. In practice, however, it is usual to employ a variable resistance in the field-circuit for regulating the amount of current passing around the field, according to the speed at which the machine is driven, and by this means fixing the candle-power of the lamps. In such a case the adjusted cut-off is used to prevent the lowering of the resistance beyond a predetermined point, and in this case the catch $f$ is not indispensable, since it is evident that with the circuit-breaker the machine is not capable of doing more than a certain and fixed amount of work.

This device is useful in another way as a protection to the lamps in the case of an accidental "running away" of the engine driving the machine, or, in other words, by a sudden and abnormal increase in its rate of speed.

I am aware that the combination, with a dynamo or magneto electric machine, of an automatic circuit-breaker is not broadly new; but, so far as I am aware, the circuit-breakers have been connected with and used for interrupting the main circuit, which, in the case of large machines, would require mechanism of a very complex and expensive character.

Having now described my invention, what I claim as new, and desire to secure by Letters Patent, is—

1. The combination, with a dynamo-electric machine in which the field-magnets are wound by conductors forming a derived circuit from the main or external circuit of the machine, of an automatic circuit-breaker included in said derived circuit and operating, on an increase of the current beyond a predetermined limit, to interrupt the continuity of the same, substantially as and for the purpose set forth.

2. The combination, with a dynamo-electric machine of the kind described, of an electro-magnet included in the derived field-circuit, an adjustable armature constituting a circuit-breaker, and a catch for engaging with the same when drawn down by the magnet, as described.

In testimony whereof I have hereunto set my hand this 6th day of May, 1882.

EDWARD WESTON.

Witnesses:
HENRY A. BECKMEYER,
W. FRISBY.